United States Patent [19]

Peters

[11] 3,783,555
[45] Jan. 8, 1974

[54] SELF-WATERING FLOWER POT

[75] Inventor: James R. Peters, Chicopee, Mass.

[73] Assignee: Universal Products Development Corporation, Simsbury, Conn.

[22] Filed: Jan. 3, 1972

[21] Appl. No.: 214,764

[52] U.S. Cl. .................................... 47/38, 220/13
[51] Int. Cl. ............................................ A01g 27/00
[58] Field of Search .................. 47/38, 38.1, 34.13; 215/12

[56] References Cited
UNITED STATES PATENTS

| | | | |
|---|---|---|---|
| 3,557,490 | 1/1971 | Delaney | 47/38.1 |
| 3,043,053 | 7/1962 | Peters | 47/38.1 |
| 2,770,957 | 11/1956 | Bronson | 47/38 X |
| 2,680,871 | 6/1954 | Gullholm | 47/38 X |
| 3,192,665 | 7/1965 | Cloud | 47/38.1 |
| 2,885,825 | 5/1959 | Longacre | 47/38 |
| 3,381,410 | 5/1968 | Potain | 47/38 |

Primary Examiner—Robert E. Pulfrey
Assistant Examiner—R. T. Rader
Attorney—Peter L. Costas

[57] ABSTRACT

A self-watering flower pot has a unitary, double-walled construction comprising an outer shell, a potting receptacle therewithin, and a water-receiving chamber in the space between the outer shell and the inner receptacle. An upwardly opening recess is defined in the upper surface of the bottom wall of the outer shell, and the potting receptacle has a depending peripheral wall element which extends about a passageway through a lower portion thereof and is disposed with its lower edge within the recess of the bottom wall. In operation a vacuum is created in the space between the double walls, which is relieved when the soil within the potting receptacle becomes sufficiently dry to permit air to permeate and pass outwardly into the chamber. This effectively meters the water by allowing a small amount to flow as dictated by the dryness of the soil. The elements in the lower portion of the flower pot trap the soil and thereby eliminate the need for a porous plug of the type which is normally used for that purpose at such a water/soil interface.

10 Claims, 2 Drawing Figures

PATENTED JAN 8 1974  3,783,555

SELF-WATERING FLOWER POT

BACKGROUND OF THE INVENTION

In the past, a variety of flower pots, planters, and the like have been proposed which have self-contained reservoirs for irrigation of the vegetation therewithin. In some instances such devices have been designed for automatic control of the water to furnish it on a substantially continuous basis and to minimize the frequency with which refilling of the reservoir is necessary. Although the prior art devices of this type have met with varying degrees of commercial success, they have generally tended to be somewhat deficient in one or more respects.

In some cases, the prior self-watering flower pots have not been sufficiently reliable or efficient in terms of furnishing water to the plant; either they have tended to cause flooding by metering the water too rapidly, or they have failed to provide a supply of water adequate to sustain the vegetation. In other cases, undue complexity and/or the difficulty of achieving adequately sealed seams between parts of the devices have made manufacture difficult and expensive, and have resulted in high rejection rates of unacceptable units and in a need for time-consuming and costly testing procedures.

To a large extent these deficiencies of the prior art devices have been overcome by the self-watering flower pot described and claimed in the copending application of James R. Peters and Ernest B. Eniti entitled "Self-Watering Flower Pot," which was filed under Ser. No. 160,009 on July 6, 1971. Although the novel devices thereof are highly effective in operation, there has remained a need for flower pots of equivalent performance which may be manufactured more conveniently and at lower cost.

Accordingly, it is an object of the present invention to provide a novel self-watering flower pot that is capable of furnishing water on a substantially continuous basis and at a desirable rate to sustain the vegetation therewithin.

It is also an object of the invention to provide such a flower pot which is of relatively simple construction, and which can therefore be manufactured with a high degree of facility and economy.

A more specific object is to provide a novel flower pot of the foregoing type, which operates efficiently without any added porous plug member for the restraint of soil at the water interface.

Another object of the invention is to provide a flower pot having the foregoing features and advantages, which in addition may be produced in a minimum number of operations and ideally as a single-piece unit, thereby further facilitating production and minimizing the need for leakage testing.

SUMMARY OF THE DISCLOSURE

It has now been found that the foregoing and related objects of the invention are readily attained in a self-watering flower pot comprising an inner shell element providing a potting receptacle and an outer shell element spaced therefrom. Each of the shell elements has a peripheral sidewall which is interconnected with that of the other sidewall adjacent its upper end to provide a unitary, double-walled container. The container has at least one water-receiving chamber in the space between the shell elements with an aperture for water-filling access thereinto, and closure means is also provided to normally seal the aperture against the entry of air therethrough. The outer shell element has a bottom wall portion with an upstanding portion spaced inwardly from the sidewall thereof and defining an upwardly opening cavity therein. The sidewall of the inner shell element has a bottom wall portion with a passageway therethrough which is vertically aligned over the cavity of the bottom wall portion of the outer shell element. A depending peripheral wall element extends from the inner shell element about the passageway, and into the cavity. As a result, the cavity-defining means and the depending peripheral wall cooperatively define a tortuous flow path between the passageway of the inner shell element and the water-receiving chamber of the container.

Preferably, the cavity-defining means comprises an upstanding wall portion adjacent the center of the bottom wall portion, and the inwardly extending portion of the inner sidewall constitutes a bottom wall of the potting receptacle. The lower portion of the flower pot may have formed in its underside a plurality of downwardly opening channels which slope upwardly and outwardly from adjacent the depending peripheral wall element, such channels facilitating air flow from the vicinity of the passageway and bottom wall cavity. The upper portion of the sidewall of the inner shell element may be downwardly and inwardly inclined with the lower portion thereof extending more abruptly inwardly therefrom. Most desirably, the sidewalls, cavity-defining means and depending peripheral wall are substantially circular in cross section and are concentrically disposed in the flower pot.

In especially preferred embodiments of the invention the cavity-defining means is positioned axially below the lower portion of the inner shell element with the upper edge thereof spaced a short distance therefrom to define therebetween a narrow peripheral flow passage from the cavity to the chamber between the shell elements. The bottom wall portion of the flower pot may comprise a thin, generally planar base wall having the cavity-defining means spaced inwardly from the periphery thereof and having the sidewall extending upwardly from thereabout. The cavity-defining means in such a case may advantageously comprise a continuous ridge of inverted, generally U-shaped cross section projecting above the plane of the base wall. In addition, means may be provided for securing the bottom wall portion of the outer shell element and to the lower portion of the inner shell element to the flower pot and to help maintain the spacing of the flow passage. Such securing means may comprise a plurality of short connecting elements extending from the upper edge of the cavity-defining means at points spaced about the periphery of the cavity.

The elements comprising the container of the flower pot may be fabricated of a synthetic thermoplastic polymeric material, and ideally the container is integrally formed from such a material as a single-piece unit. Most desirably the flower pot is free from any porous interface barrier serving to restrain migration of soil from the potting receptacle to the water chamber.

DETAILED DESCRIPTION OF THE ILLUSTRATED EMBODIMENT

Figure 1:
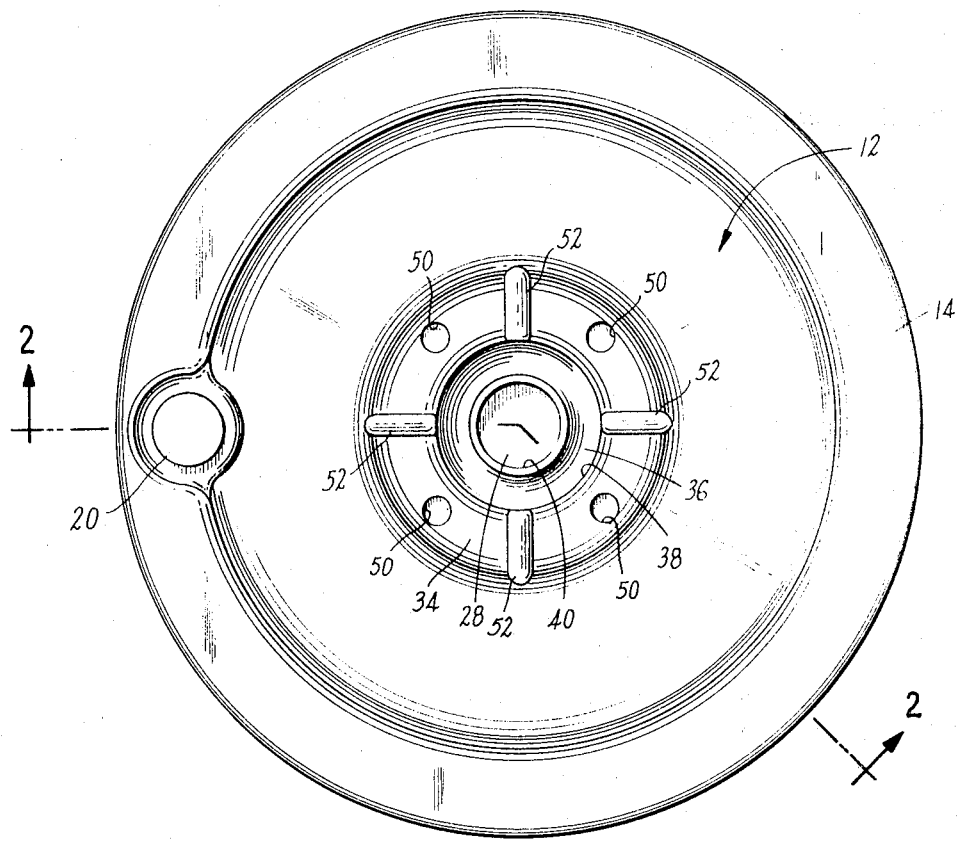
FIG. 1 is a plan view of a self-watering flower pot embodying the present invention.
Figure 2:
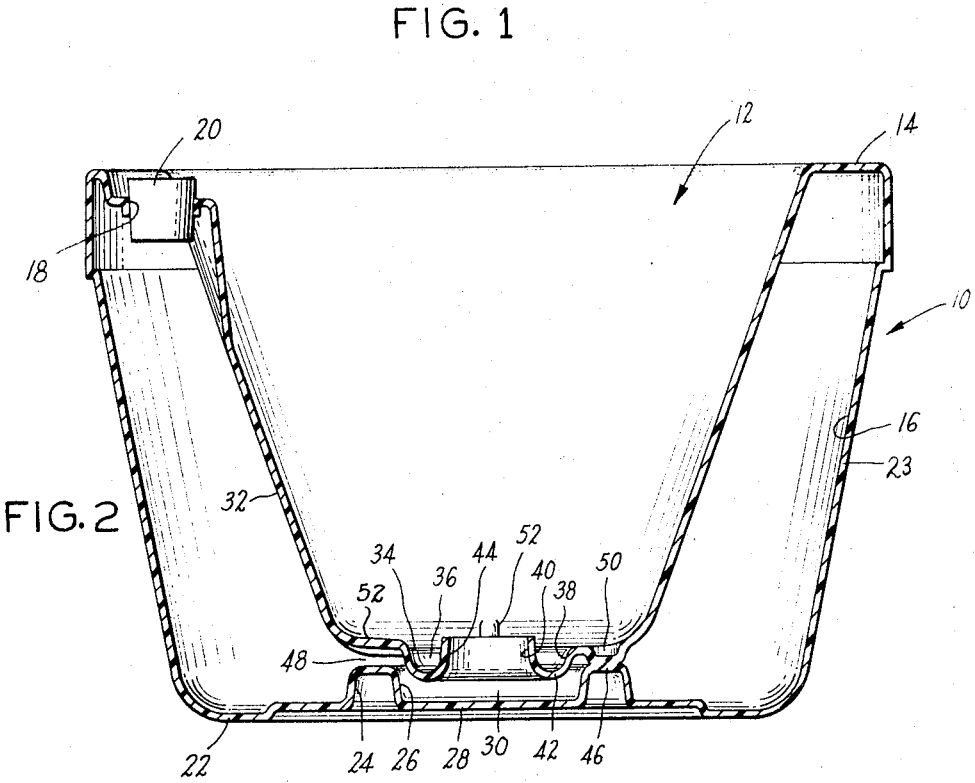
FIG. 2 is a sectional view thereof along the line 2—2 in FIG. 1.

Turning now in detail to the appended drawing, therein illustrated is a seamless, double-walled container providing a self-watering flower pot embodying the present invention and including an outer shell element and an inner potting receptacle, generally designated by the numerals 10 and 12 respectively. The outer shell element 10 and inner receptacle 12 are interconnected at their upper ends by a circumferential shoulder portion 14 to provide a single-piece unit, and they define therebetween a water chamber or reservoir 16. The shoulder portion 14 has an aperture 18 provided therein to permit water-filling access to the chamber 16, and a stopper or plug 20 is normally seated in the aperture 18 to prevent the entry of air into the chamber 16 during use of the flower pot.

The outer shell element 10 consists of a thin, generally circular base or bottom wall 22 and a frustoconical sidewall 23 extending upwardly from about the circumference thereof. Centrally located on the bottom wall 22 is a continuous ridge 24 of inverted, generally U-shaped cross section providing a low, upstanding circular inside wall 26 which cooperates with the circular floor portion 28 to define an upwardly opening well or cavity 30 in the bottom wall 22.

The inner potting receptacle 12 is comprised of a downwardly tapered frustoconical wall portion 32 which depends from the circumferential shoulder portion 14 and has a more abruptly inwardly extending lower portion 34. Centrally located on the lower portion 34 is a short depending circular trough or ring 36 of generally U-shaped cross section which is received within the recess 30 of the bottom wall 22. The ring 36 provides an outer wall element 38 which is spaced inwardly from the circular inside wall 26 of the continuous ridge 24, and an inner wall element 40 extending upwardly from the lower edge 42 and defining a central passageway 44 which is axially aligned over the recess 30. The crest 46 of the continuous ridge 24 lies axially beneath the lower portion 34 of the inner potting receptacle 12, and is spaced a short distance therefrom to define a narrow circumferential passage 48 into the water chamber 16.

To rigidify the structure and to maintain the spacing between the bottom wall 22 of the outer shell element 10 and the lower portion 34 of the inner receptacle 12 (and hence the spacing of the passage 48), small connecting bosses 50 extend between the crest 46 of the ridge 24 and the lower portion 34 of potting receptacle 12 at spaced locations about the depending ring 36. In a molded unit, such bosses 50 may be produced simply by forcing small areas of the lower portion 34 downwardly into contact with the ridge 24 while the material is in a deformable and bondable state, four such areas being illustrated in FIG. 1. Finally, downwardly opening channels or grooves 52 which slope upwardly and outwardly are formed in the lower portion 34 of the inner receptacle 12, and serve to facilitate flow from the vicinity of the cavity 30.

From the foregoing it is believed that operation of the flower pot illustrated will be quite apparent. In use, the inner receptacle 12 is filled with a suitable potting soil or other medium (not shown) of appropriate consistency to permit air permeation when in a relatively dry state. A portion of the soil will enter the passageway 44 to rest upon the floor portion 28 of the cavity 30, with the relatively small spacing between the edge 42 of the depending ring 36 and the floor 28 limiting outward movement of the soil and controlling the surface area of soil which is exposed thereat.

The plant (not shown) may then be placed in the soil, the chamber 16 filled with water, and the plug 20 replaced in the aperture 18 to seal the chamber 16 against the atmosphere at that location. Water flows initially from the chamber 16 through the circumferential passageway 48 and into contact with the soil present beneath the edge 42 of the depending ring 36, with capillary action causing it to pass through the soil for distribution to the plant. Since the chamber 16 is sealed above water level, after enough water has passed into the receptacle 12 to wet the soil sufficiently to form a seal for the passageway 44, a vacuum is created in the upper portion of the chamber which diminishes and ultimately substantially terminates water flow. As the water supply in the receptacle 16 is depleted, either by evaporation or through utilization by the growing plant, the resulting dryness of the soil permits air to permeate through it and to pass into the cavity 16. This causes small air bubbles to collect at the soil/water interface, with the air ultimately moving upwardly through the water to relieve the vacuum so as to permit a small additional amount of water to pass into the soil; hence, it is believed that a capillary/vacuum balance is established which regulates water flow. The upwardly sloping channels 52 and the inner sidewall 32 facilitate outward and upward movement of the air bubbles, thereby avoiding air blockage and ensuring efficient operation.

As has been mentioned, the spacing between the edge 42 of the depending ring 36 and the floor portion 28 of the cavity 30 will determine, at least to some extent, the surface area of soil exposed for capillary action; it is therefore believed to affect in turn the rate and/or volume of water which enters the soil under any given set of conditions. This relationship of the parts also helps to limit outward migration of soil, thereby cooperating with the continuous ridge 24 to effectively prevent undue quantities of soil from passing from the potting receptacle 12 into the chamber 16. Because of these factors, the connecting bosses 50 are believed to be especially beneficial not only because they tend to rigidify and thereby strengthen the entire unit, but also because they tend to maintain the relative positions of the ridge 24 and floor portion 28 to the lower portion 34 of the sidewall 32 and the ring 36 respectively. Other means of connecting these parts or of maintaining the relative positions thereof may, of course, be used if so desired, and it should be appreciated that distances between parts in the lower portion of the device are somewhat exaggerated for clarity of illustration.

Since the soil is effectively trapped, by virtue of the tortuous path that it must follow to pass from the passageway 44 into the chamber 16, the present flower pot operates effectively without requiring any porous plug or other interface barrier to restrain the soil. Such plugs, which are typically made of cellular polyurethane, felt, or the like, are undesirable not only because they tend to become fouled with algae or otherwise clogged, resulting in disrupted operation and in some instances detriment to the vegetation, but also because the need for such a barrier increases the complexity and cost of manufacture.

Although other types of materials can be used in the construction of the container, it will be appreciated that the synthetic polymers, and especially the thermoplastics, will be most appropriate in the majority of cases. This is so not only because of the aesthetic appeal and structural properties that articles made from such materials may exhibit, but also because of the facility and economy with which they can be fabricated into the various configurations desired. Thermoplastics, such as the polyolefins (e.g., polyethylene, polypropylene) and the vinyl and vinylidene polymers (e.g., polystyrene, high impact polystyrene, polyvinyl chloride), to name only a few, are relatively strong, inexpensive, and readily fabricated by conventional molding techniques; accordingly, they will often be used preferentially.

By use of such molding techniques the flower pots of the invention may be fabricated with a minimum number of seams, thus simplifying manufacturing by reducing the number of bonding operations necessary, obviating leakage testing to a certain extent, and affording other advantages. In fact, the container of the embodiment illustrated is adapted for production by integrally forming it as a single piece in a one-step blow-molding operation, thereby completely eliminating seams and greatly facilitating manufacture. Therefore, it constitutes a most preferred embodiment of the invention.

Although circular flower pots may be traditional and most prevalent, polygonal, square, rectangular or other cross sectional configurations are not unusual (particularly for planters) and are considered to be fully within the concept of the present invention. In addition, the container of the flower pot or planter may have internal construction partitioning the space between the shell elements to provide a plurality of independent water chambers or compartments therewithin, each having a water-filling aperture of its own, such as that designated 18 in the drawing. Independent flow passages may, in such instances, be provided for each of the compartments to thereby permit different flow rates, various fertilization or treatment procedures, etc., to be used in selected portions. Of course, the potting receptacle may also be segmented if so desired.

Thus, it can be seen that the present invention provides a novel self-watering flower pot that is capable of furnishing water on a substantially continuous basis and at a desirable rate to sustain the vegetation therewithin. The flower pot may be of relatively simple construction and may be produced with a limited number of operations, thereby facilitating production, enhancing the economy of manufacture, and minimizing the need for leakage testing. The invention enables the production of a novel flower pot of the foregoing type which operates efficiently and without the need for any added porous plug member to restrain soil migration at the water interface, and it is adapted for production as a single-piece unit.

I claim:

1. A self-watering flower pot comprising an inner shell element providing a potting receptacle and an outer shell element spaced therefrom, each of said shell elements having a peripheral sidewall with said sidewalls of said inner and outer shell elements being interconnected adjacent their upper ends to provide a unitary, double-walled container, said container having at least one water-receiving chamber in the space between said shell elements and having an aperture for water-filling access thereinto; and closure means normally sealing said aperture of said container against the entry of air therethrough; said outer shell element having a bottom wall portion with an upstanding portion spaced inwardly from said sidewall thereof to provide an upwardly opening cavity, said inner shell element having a bottom wall portion with a passageway therethrough vertically aligned over said cavity of said bottom of said outer shell element, said bottom wall portion of said inner shell element also having a depending wall element extending about the periphery of said passageway and into said cavity, said cavity-providing upstanding portion and said depending wall element thereby defining a tortuous flow path between said passageway and said water-receiving chamber.

2. The flower pot of claim 1 wherein said upstanding portion is provided by a rib in said bottom wall portion adjacent the center thereof and wherein said bottom wall portion of said potting receptable is configured to provide a depending rib forming said depending wall element.

3. The flower pot of claim 1 wherein said bottom wall portion of said inner shell element is configured to provide a plurality of downwardly opening channels sloping upwardly and outwardly towards said sidewall thereof from adjacent said depending wall element.

4. The flower pot of claim 1 wherein said sidewalls of both said shell elements, said cavity in said outer shell element and said depending wall element in said inner shell element all are substantially circular in cross section and are concentric.

5. The flower pot of claim 1 wherein the bottom wall portion of said outer shell element extending toward said sidewall thereof from said cavity therein is spaced a short distance from the adjacent bottom wall portion of said inner shell element to define therebetween a narrow peripheral flow passage from said cavity to said chamber between said shell elements.

6. The flower pot of claim 5 wherein said bottom wall portion of said outer shell element is a thin wall having an upstanding rib spaced inwardly from said sidewall thereof providing said upstanding portion defining said cavity, said rib being continuous and of inverted, generally U-shaped cross section and projecting above the lowest plane of said bottom wall portion.

7. The flower pot of claim 1 wherein there is included interconnecting means securing said bottom wall portion of said outer shell element to said bottom wall portion of said inner shell element, thereby rigidifying said flower pot and tending to maintain the spacing of said flow path between said depending wall element of said inner shell element and said bottom wall portion of said outer shell element.

8. The flower pot of claim 7 wherein said securing means comprises a plurality of spaced ribs extending between said bottom wall portions of said shell elements.

9. The flower pot of claim 1 wherein said container is fabricated of a synthetic thermoplastic polymeric material.

10. The flower pot of claim 9 wherein said container is integrally formed from said material as a one piece unit.

* * * * *